April 1, 1958 H. M. CRAIN 2,829,209

HIGH FREQUENCY BIAS SUPPLY FOR MULTI-CHANNEL
MAGNETIC SOUND SYSTEM
Filed Dec. 19, 1956

HARRY M. CRAIN
INVENTOR.

BY [signature]
[signature]
ATTORNEYS

United States Patent Office 2,829,209

Patented Apr. 1, 1958

2,829,209

HIGH FREQUENCY BIAS SUPPLY FOR MULTI-CHANNEL MAGNETIC SOUND SYSTEM

Harry M. Crain, Phillipsburg, Pa., assignor, by mesne assignments, to the United States of America as represented by the Secretary of the Navy Application December 19, 1956, Serial No. 629,428

9 Claims. (Cl. 179—100.2)

Figure 1:
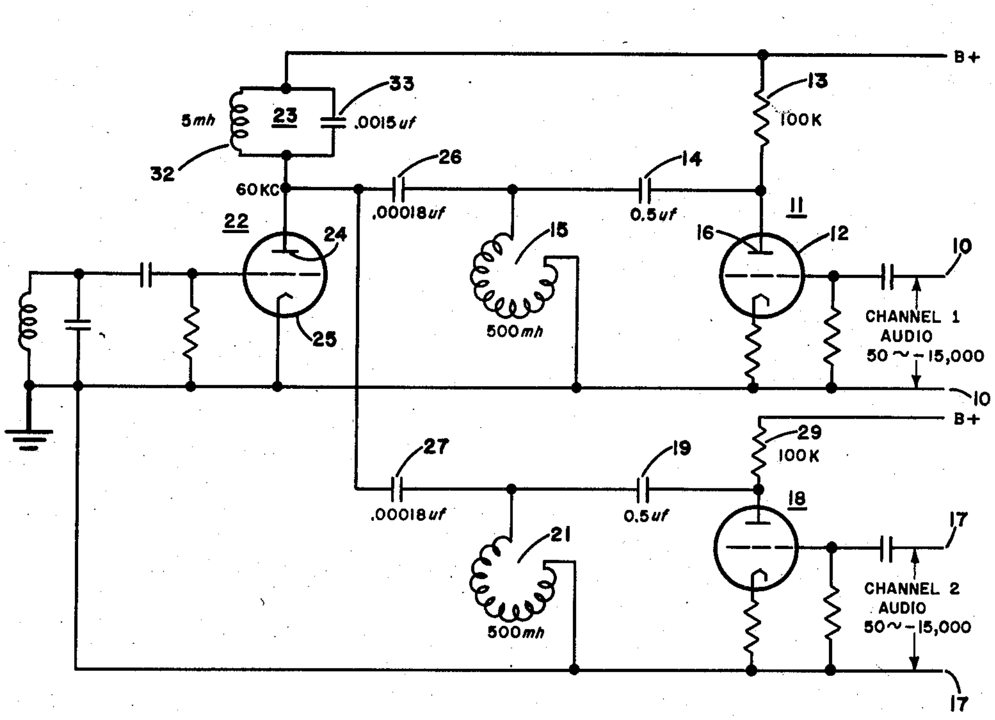

This invention relates to high frequency bias supplies for multi-channel magnetic sound recording and reproducing systems and more particularly to a high frequency bias supply wherein a bias signal is supplied to all the channels from a single source.

Magnetic recording and reproducing devices have found many useful commercial and experimental applications. Such devices utilize a record medium which is magnetic and, in recording thereon, variations are effected in the remanent magnetization of the record medium, these variations corresponding to the information to be recorded. In reproducing such a magnetic record, the variations in remanent magnetization of the medium are utilized to generate electrical voltages which are amplified and reproduced to provide the desired information. Record mediums for multi-channel systems are generally in the form of a continuous tape having a sufficient width that the desired number of signals may be separately impressed thereon.

Heretofore it has been found desirable in the recording of sound and experimental information on magnetic film or tape to record several parallel tracks adjacent to one another longitudinally along the film. In the recording of such signals a multiple head or individual heads are mounted transversely to the film or tape in a manner well known in the art.

As is well known in the art a bias frequency is necessary to linearize the recording heads and is chosen to have a value about six times the highest frequency that it is desired to record. Heretofore, it has been the practice with regard to supplying a high frequency bias signal in multiple channel tape recorders in which the various channels are operated simultaneously, such as for example, in binaural recorders and the like to use an individual oscillator for each channel. The use of individual bias oscillators obviously requires an oscillator for each channel. However, an even more important disadvantage in the utilization of a plurality of separate oscillators is the necessity that all the oscillators oscillate at the same frequency to prevent the existence of a beat frequency. Due to electromagnetic radiation such a beat frequency may exist and be detected during reproduction of the recorded signals even though the bias oscillators are electrically isolated. The existence of such a beat frequency is not generally noticeable in high level high frequency recordings but becomes particularly objectionable during intervals when no information or signals are recorded on the magnetic tape or during the reproduction of low level signals. Such beat frequencies are even more objectionable when the frequency range of interest to be recorded is at or near the beat frequency, such as may exist in the recording of component operation in experimental tests.

The present invention utilizes a single bias oscillator for multi-channel operation without objectionable cross talk by providing a voltage divider network incorporating, as between any two channels, the parallel tuned circuit in the plate circuit of the bias oscillator, the respective recording heads and coupling condensers having a high attenuation to audio signals and a low attenuation to the bias signal.

The provision of a single bias oscillator for multi-channel operation wherein cross talk resulting from the inter-coupling of the channels may be maintained at or below levels considered acceptable for multi-channel operation, eliminates substantially all of the difficulties and disadvantages that obtain from multi-oscillator operation and provides substantial advantages over the prior art. Utilization of the present invention will reduce power requirements, require substantially less space and maintenance, result in smaller production costs and result in more dependable and satisfactory operation, especially where a magnetic recorder incorporating the present invention is used to record experimental information such as for example, in testing airborne and subaqueous bodies.

It is, accordingly, an object of the present invention to provide an improved bias supply system for multi-channel magnetic sound systems.

It is another object of the present invention to provide a single bias supply for multi-channel magnetic sound systems.

A further object of the present invention is to provide a single bias oscillator to supply a bias signal to a plurality of recording heads in a multi-channel magnetic sound system wherein cross talk as the result of the inter-coupling of the channels may be maintained at a desirable level.

A still further object of the present invention is to provide an improved and simplified bias supply for multi-channel magnetic sound systems whereby such sound systems may be more economically produced and will occupy a smaller volume and will be comprised of a lesser number of components, the dependability and utility of such systems being thereby materially increased.

These and other objects and features of the invention, together with their incident advantages, will be more readily understood and appreciated from the following detailed description of a preferred embodiment thereof selected for purposes of illustration and shown in the accompanying drawing, in which:

Figure 1 illustrates a schematic drawing of the invention.

Figure 2:
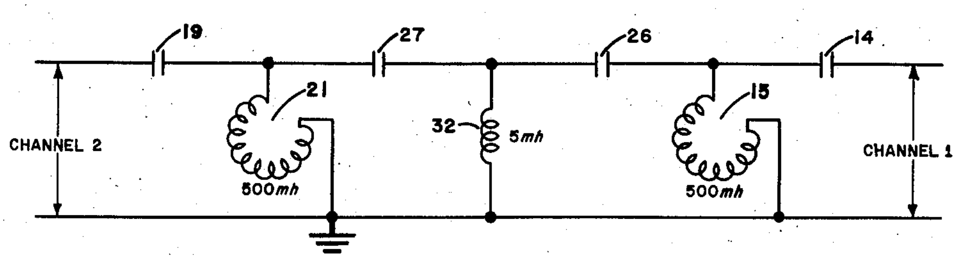

Figure 2 illustrated schematically in simplified form the coupling circuit between any two channels in a multi-channel magnetic sound recorder incorporating the invention.

Referring now to Figure 1, a signal source which may be an audio source or other form of signal source is connected to terminals 10 feeding a conventional amplifier designated generally by the numeral 11, comprised of a triode 12 having a high plate load resistance 13. The output signal of amplifier 11 is fed through a capacitor 14 to the recording head 15 for channel 1.

Although the amplifier 11 is shown as utilizing a single triode 12 it is to be understood that substantially any amplifier suitable for recording purposes may be used, it being the function of amplifier 11 to amplify the audio signal or the like to a value suitable for recording on a magnetic tape. The output of amplifier 11 is taken from the plate 16 and fed through a capacitor 14 to the recording head 15 for channel 1.

Channel 2 is similar to channel 1, the input signal for this channel being connected at terminals 17, amplified by an amplifier 18 similar to amplifier 11, the output being fed through a capacitor 19 to the recording head 21 for channel 2.

A bias frequency as mentioned hereinabove is supplied from a bias oscillator indicated generally by the numeral 22. A parallel tuned circuit 23 is provided in the plate circuit of the bias oscillator 22 and the bias signal is supplied from the plate 24 of the triode 25 through coupling capacitors 26—27 to the recording heads 15—21. If the coupling capacitors 26—27 are selected to have a value such that they are substantially equal and have a negligible reactance at the bias frequency and if the isolating capacitors 14—19 are selected to have a negligible reactance at input signal frequencies, and amplifiers 11—18 are provided with high plate load resistance 13—29 the bias signal may be supplied to the recording heads 15—21 with minor attenuation and with negligible effect on the operation of the amplifiers 11—18. In view of the above, it may now be apparent that the bias signal may be supplied to a plurality of recording heads with little or no difficulty or effect on the input signal.

At the bias frequency the parallel resonant circuit 23 comprised of inductance 32 and capacitor 33 has a very high impedance and the tube 25 supplies a bias signal to high impedance shunt loads consisting substantially of the recording heads 15—21 and the plate load resistors 13—29.

It may now also be apparent that while the arrangement as described hereinabove will provide a suitable bias signal to a plurality of recording heads, such arrangement also provides a means whereby each recording head is coupled to every other recording head, such as for example, as is recording head 15 and recording head 21, thereby providing a path for the introduction of an undesirable signal or as it is more commonly known, cross talk, from each recording head or channel as the case may be, into every other recording head. Although the prior art indicates that a coupling path between recording heads is undesirable and is to be avoided it has been discovered that the provision of a coupling path in accordance with the present invention will allow the recording and reproduction of a plurality of signals wherein cross talk may be maintained at a level at least comparable to the prior art and if desired, at a level less than that generally considered acceptable in addition to the advantages over the prior art pointed out hereinbefore.

In order to more fully explain the absence of an undesirable level of cross talk in channel 1 and channel 2, although a coupling path exists, it is assumed, for the purpose of explanation, that the various components have the values as indicated in Figure 1 and that the frequency of the bias signal is 60 kc. With reference now to Figure 2 and on the basis of the above assumption, looking from the plate 16 of tube 12 (not shown) toward the bias oscillator 22, at audio frequencies the shunt load for tube 12 is the impedance of recording head 15 in parallel with a reactive network effectively comprised of the coupling capacitor 26 in series with inductance 32 which at audio frequencies is effectively grounded through the B+ power supply (not shown). At an audio frequency of, for example, 6 kc., and for the component values shown in Figure 1, the reactance of capacitor 26 is of the order of 150,000 ohms and the reactance of inductance 32 is of the order of 200 ohms; hence, there is at the junction of capacitor 26 and inductance 32 a voltage reduction of about 150,000 to 200 or 750 to 1. Progressing now from the junction of capacitor 26 and inductance 32 through capacitor 27 to recording head 21 an additional reduction is effected. The reactance of capacitor 27, being the same as capacitor 26, equals 150,000 ohms and the reactance of recording head 21 is about 20,000 ohms at 6 kc.; hence, at the junction of capacitor 27 and recording head 21 an additional reduction of about 150,000 to 20,000 or 7.5 to 1 is achieved. It may now be obvious that the total attenuation, or reduction of a 6 kc. signal applied to recording head 15 with respect to the existence of cross talk of the same signal in recording head 21 is the product of the above attenuations and equals about 5,625 to 1, which may be represented as about seventy-five decibels. Since Figure 2 is electrically symmetrical about inductance 32 it may be obvious that the total attenuation or reduction of a 6 kc. signal from recording head 21 to recording head 15 is substantially identical.

If, for example, the desired signal-to-noise ratio of a recording is forty decibels, which is the generally accepted minimum level for most recording purposes, it is obvious that the attenuation of cross talk between channel 1 and channel 2 at 6 kc. is almost twice this amount. For audio signals having a frequency lower than 6 kc. the attenuation is greater and for audio signals having a frequency higher than 6 kc. the attenuation will be somewhat less. However, for the circuit constants as indicated in Figure 1, the attenuation between channel 1 and channel 2, or vice versa, at 10 kc. is about fifty-seven decibels, which is substantially more than the forty decibel accepted minimum.

The above circuit constants and attenuation have been given only by way of example to facilitate understanding of the invention and it is to be understood that the maximum amount of attenuation between any two channels is not limited to the values as given hereinabove. Substantially any reasonable degree of attenuation may be secured by the proper adjustment of component values. As pointed out hereinabove, the greatest attenuation occurs between the coupling capacitors (capacitors 26—27 as shown in Figure 1) and inductance 32. Although only two channels have been shown and described it is to be understood that the present invention is not so limited, the number of channels supplied by one bias oscillator being limited only by the ability of the bias oscillator to supply power to them.

For optimum operation it is desirable that a recording head have a fixed amount of bias voltage dropped across it. Therefore, if the voltage at the plate 24 of tube 25 is raised, the values of capacitors 27—26 may be selected such as to provide an increase in the audio signal voltage dropped across them and will also provide an increase in the bias signal dropped across them thereby maintaining the bias voltage across recording heads 15—21 at the desired value and further reducing the audio signal introduced from recording head 15 into recording head 21 or vice versa by a substantial amount. Proper selection of the reactance of inductance 32 will further increase the attenuation of cross talk although such will in general be substantially controlled by the resonant frequency selected for the bias oscillator. Inductance 32 should in any event be selected to have as low as reactance as possible to audio signals. It may now be obvious that the present invention eliminates the necessity of individual bias oscillators for each channel in a multi-channel magnetic sound system and the disadvantages that obtain in the use of individual bias oscillators.

It may now be further obvious that the present invention is simple and efficient in operation and construction and maintain cross talk, due to the coupling of the signal bias oscillator simultaneously to all channels, to minimum values and at least to a value substantially equal to or less than the amount of cross talk due to other sources, such as for example, that due to the proximity of association of one recording head with another.

While the present invention has ben described in its preferred embodiment it is realized that modifications may be made, and it is desired that it be understood that no limitations upon the invention are intended other than may be imposed by the scope of the appended claim.

Having now disclosed my invention, what I claim as new and desire to secure by Letters Patent of the United States is:

1. A bias supply system for multi-channel magnetic sound recorders adapted for recording signals from a plurality of signals sources comprising: a bias oscillator; a plurality of magnetic recording heads; a plurality of independent signal channels, each of said channels being connected a different one of said recording heads and having an input for connection to a different one of said signal sources; and means associated with said bias oscillator and said recording heads whereby the output signal of said bias oscillator is applied to said recording heads and each said input signal applied to each said recording head is applied to each other recording head, said means being adapted to apply a bias signal having a predetermined amplitude to said recording heads and to attenuate said input signals applied to each said other recording head whereby the amplitude of said signal applied to each said other recording head is substantially reduced.

2. A bias supply system for multi-channel magnetic sound recorders adapted for recording signals from a plurality of signals sources comprising: a bias oscillator; a plurality of magnetic recording heads; a plurality of independent signal channels, each of said channels being connected to a different one of said recording heads and having an input for connection to a different one of said signals sources; and coupling means associated with said bias oscillator and said recording heads whereby the output signal of said bias oscillator is applied to said recording heads and each said input signal applied to each said recording head is applied to each other recording head, said means being adapted to apply said bias signal to said recording heads with a fixed amplitude and to attenuate said input signals applied to each said other recording head whereby the amplitude of said signals applied to each said other recording head is substantially reduced.

3. A bias supply system for multi-channel magnetic sound recorders adapted for recording signals from a plurality of signals sources comprising: a bias oscillator; a plurality of magnetic recording heads; a plurality of independent signal channels, each of said channels being connected to a different one of said recording heads and having an input for connection to a different one of said signal sources; and coupling means associated with said bias oscillator and said recording heads whereby the output signal of said bias oscillator is applied to said recording heads and each said input signal applied to each said recording head is applied to each other recording head, said means being adapted to offer minimum attenuation to said bias signal and maximum attenuation to said input signals applied to each said other recording head whereby the amplitude of said signals is reduced to a value considerably less than its original value.

4. A bias supply system for multi-channel magnetic sound recorders adapted for recording signals from a plurality of signals sources comprising: a bias oscillator; a plurality of magnetic recording heads; a plurality of independent signal channels, each of said channels being connected to a different one of said recording heads and having an input for connection to a different one of said signal sources; and means associated with said bias oscillator and said recording heads whereby the output signal of said bias oscillator is applied to said recording heads and each said input signal applied to each said recording head is applied to each other recording head, said means comprising a voltage divider circuit with respect to said input signals and a coupling circuit with regard to said bias signal, said means being adapted to offer minimum attenuation to said bias signal and maximum attenuation to said input signals applied to each said other recording head whereby said signals applied to each said other recording head are attenuated to a value considerably less than said input signals.

5. The combination as described in claim 4 wherein said coupling circuit with regard to the bias signal is comprised of a plurality of coupling capacitors one each being disposed between said bias oscillator and a different one of said recording heads, said capacitors having a low impedance to the bias signal and a high impedance to the input signals.

6. The combination as described in claim 5 wherein said voltage divider circuit with regard to said input signals is comprised of said recording heads, said coupling capacitors, and an impedance element, said impedance element being connected at one end between said coupling capacitors and effectively grounded with regard to said input signals.

7. The combination as described in claim 6 wherein said impedance element is the plate load of the bias oscillator, said plate load having a low impedance to the input signals whereby as between any two channels the majority of an input signal to one recording head is dropped across the coupling capacitor associated therewith and said impedance element and a substantial portion of the balance of said input signal is dropped across said coupling capacitor associated with said other recording head.

8. A bias supply system for multi-channel magnetic sound recorders adapted for recording signals from a plurality of signals sources comprising: a bias oscillator, said oscillator being comprised of a first plate load having a high impedance to the bias oscillator output signal and a low impedance to said input signals and effectively grounded with regard to said input signals; a plurality of magnetic recording heads; a corresponding plurality of amplifiers having an input for connection to a different one of said input signals, the output signal of each amplifier being connected to a different one of said recording heads, each of said amplifiers being comprised of a second plate load having a high impedance to the bias signal; a corresponding plurality of isolating condensers, each of the isolating condensers being connected between the output of a different one of said amplifiers and a different one of said recording heads, said isolating condensers having a low impedance to the bias signal and the input signals; and a corresponding plurality of coupling condensers, each of said coupling condensers being connected between the output of said oscillator and a different one of said recording heads, said coupling condensers having a low impedance to said bias signal and a high impedance to said input signals whereby said bias signal is applied substantially undiminished to each said recording head and only a small portion of each input signal applied to any one recording head is applied to any one different recording head.

9. A bias supply system for multi-channel magnetic sound recorders adapted for recording signals from a plurality of signals sources comprising: a bias oscillator, said oscillator being comprised of a first plate load and a first vacuum tube having a plate, a grid and a cathode, said first plate load having a high impedance to the bias oscillator output signal and a low impedance to said input signals and effectively grounded with regard to said input signals; a plurality of magnetic recording heads; a plurality of independent signal channels, each of said channels being connected to a different one of said recording heads and having an input for connection to a different one of said input signals, each said channel being comprised of a second plate load and a second vacuum tube having a plate, a grid and a cathode, said second plate load having a high impedance to the bias signal; a corresponding plurality of isolating condensers, each of said isolating condensers being connected between a different one of said second vacuum tube plates and a different one of said recording head, said isolating condensers having a low impedance to the bias signal and the input signals; and a corresponding plurality of coupling condensers, each of said coupling condensers being connected between said first vacuum tube plate and a different one of said recording heads, said coupling condensers having a low impedance to said bias signal and a high impedance to said input signals whereby said bias signal is applied substantially undiminished to each said recording head and only a small portion of each input signal initially applied to any one recording head is applied to any one different recording head.

No references cited.